Oct. 10, 1967   H. T. HOLSMAN   3,345,788
PLASTER OR STUCCO BEAD
Filed Oct. 8, 1965   2 Sheets-Sheet 1
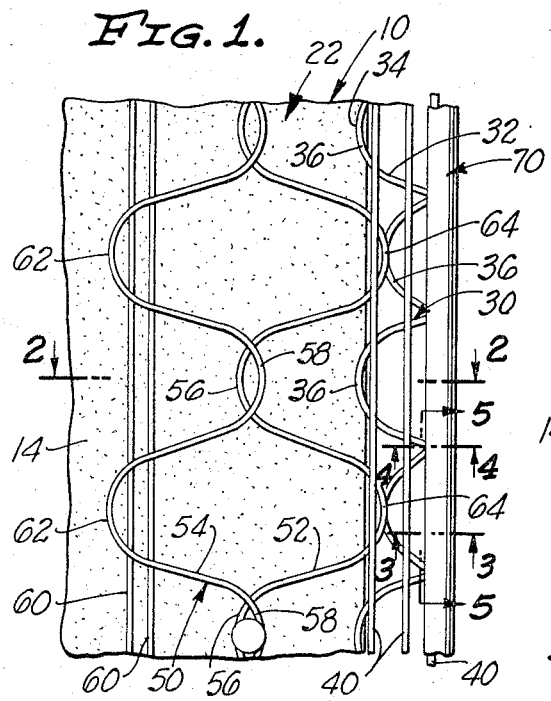
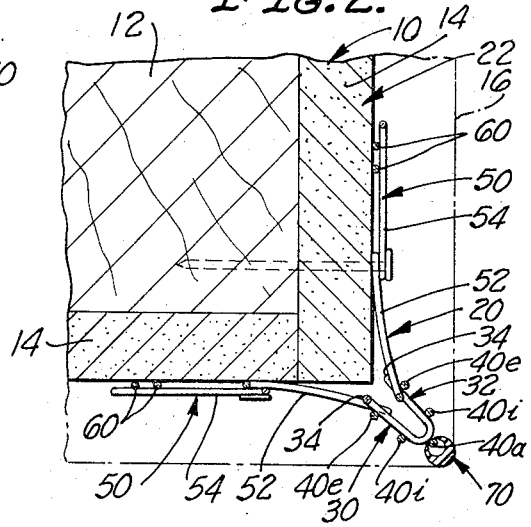
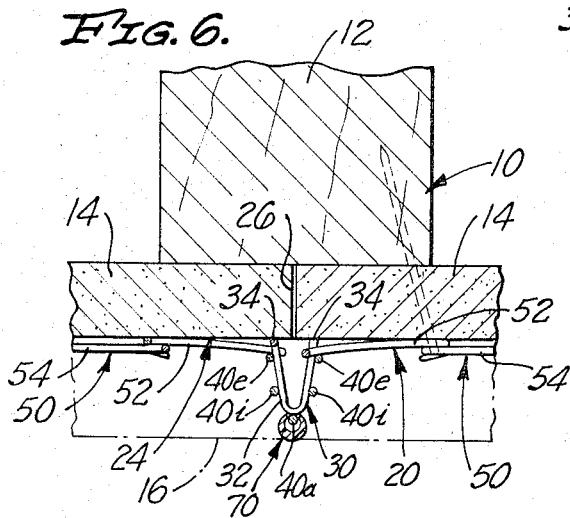
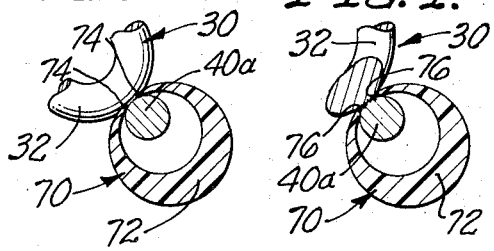
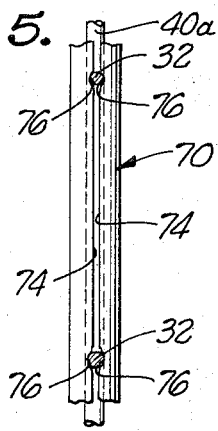
INVENTOR
HENRY T. HOLSMAN
BY HIS ATTORNEY
HARRIS, KIECH, RUSSELL & KERN

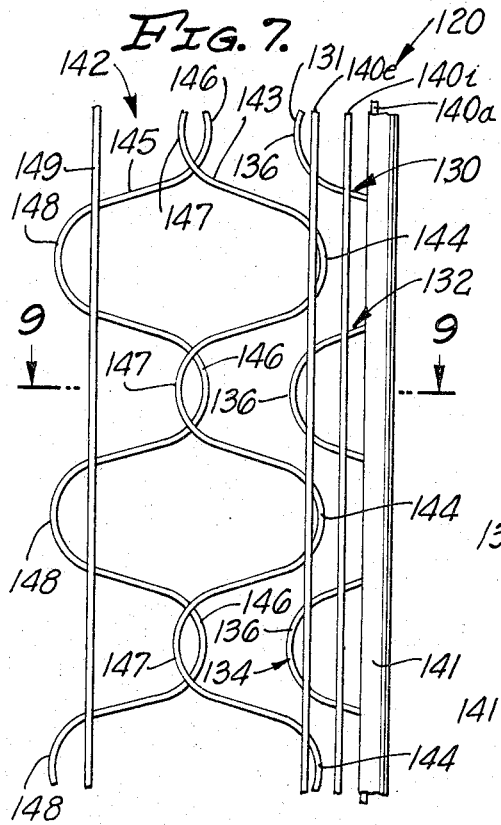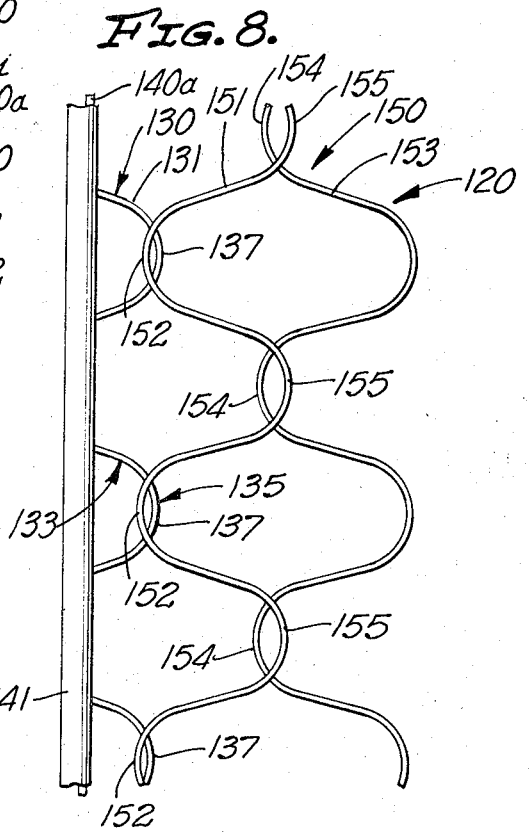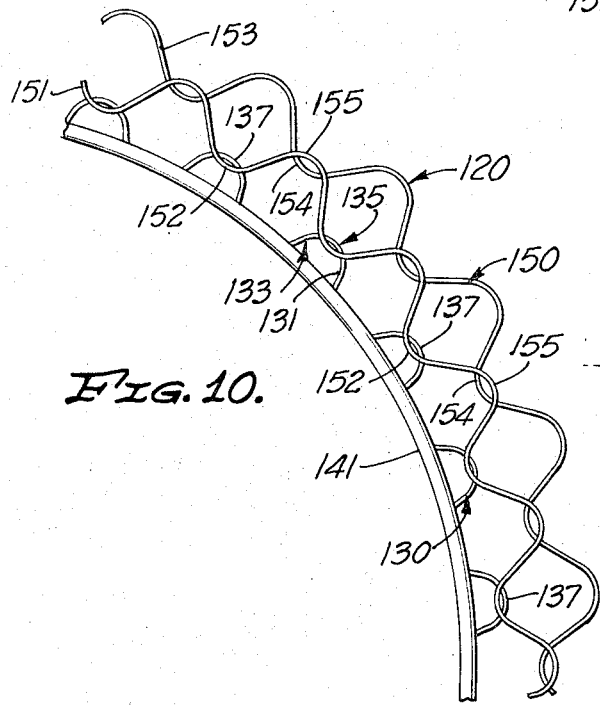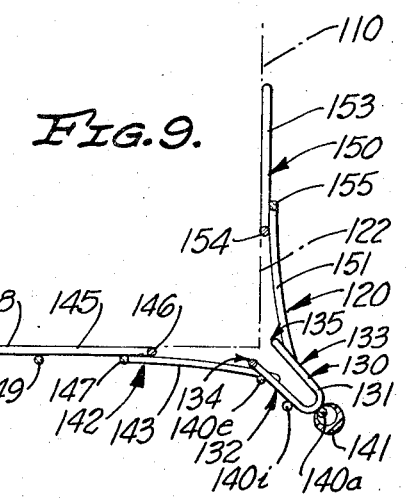

United States Patent Office 3,345,788
Patented Oct. 10, 1967

3,345,788
PLASTER OR STUCCO BEAD
Henry T. Holsman, 1045 Alston Road,
Santa Barbara, Calif. 93103
Filed Oct. 8, 1965, Ser. No. 494,064
8 Claims. (Cl. 52—254)

The present invention relates in general to a reinforcing bead for plaster, stucco, or the like, and, more particularly, to a reinforcing bead comprising components having small cross sections to provide an extremely open construction. With such a construction, the reinforcing bead may be completely filled with plaster, stucco, or other cementitious material, so that a layer of such material in which the bead is embedded is substantially solid throughout the space occupied by the bead.

More specifically, the invenion contemplates a reinforcing bead of open construction which is made of wire, i.e., which is composed of a plurality of small-diameter wires. Such wires provide adequate reinforcement for the cementitious material, but occupy very little volume so that the cementitious material is substantially solid throughout the space occuplied by the bead. Because of the small volumes occupied by the reinforcing wires, the cementitious material enveloping the bead remains substantially solid even if the wires rust out in time, there being only small holes in the cementitious material under such conditions. Consequently, the reinforcing bead of the invention may be utilized exteriorly as a stucco bead since the structural integrity of the stucco is not affected significantly by deterioration of the bead itself.

A reinforcing bead having the foregoing general characteristics is disclosed and claimed in my Patent No. 3,175,330, granted Mar. 30, 1965. The primary object of the present invention is to provide a reinforcing bead incorporating improvements on that disclosed in such patent.

More particularly, my prior patent discloses a plaster or stucco bead, having the form of either a corner bead or a screed bead, comprising: a longitudinal rib of open construction and of generally U-shaped cross section and formed of wire; longitudinal wires welded directly to the wire forming the rib on the convex side or surface of the rib and arranged in a generally U-shaped pattern in cross section, the longitudinal wires providing the rib with a substantially continuous, generally U-shaped external contour; and longitudinal flanges of open construction projecting laterally from the respective longitudinal edges of the rib and formed of wire welded to the wire of the rib.

With the foregoing construction, the substantially continuous, generally U-shaped external contour with which the U-shaped rib is provided by the external longitudinal wires thereon, permits troweling of such materials as plaster and stucco into the interior of the rib through the spaces between the longitudinal wires thereon. More particularly, the external longitudinal wires on the generally U-shaped rib simulate the apex of a conventional sheet metal bead insofar as troweling of plaster or stucco is concerned, while still permitting troweling of the cementitious material into the interior of the rib through the spaces between the longitudinal wires thereon. Thus, ordinary troweling techniques can be used while achieving the desired result of a substantially solid body of cementitious material throughout the space occupied by the bead.

An important object in connection with one embodiment of the invention is to provide a reinforcing bead of the foregoing nature having two flanges both secured to the rib of the bead by welding them solely to the respective longitudinal wires on the rib which are nearest the longitudinal edges of the rib.

With the foregoing construction, the longitudinal edge wires on the rib, i.e., longitudinal wires on the rib nearest the longitudinal edges thereof, are capable of twisting, between the points where they are welded to the rib and the flanges, to permit varying the included angle between the flanges. In effect, the longitudinal edge wires on the rib act as hinges permitting pivotal movement of the flanges relative to the rib, which pivotal movement can be produced manually by the application of moderate forces.

The foregoing hinge-like action of the longitudinal edge wires on the rib permits flattening the bead until the included angle between the flanges is approximately 180°, whereupon the bead may be utilized as a screed bead. By pivoting the flanges relative to the rib to provide an included angle between the flanges of considerably less than 180°, a corner bead results. When the reinforcing bead of the invention is utilized as a corner bead, the included angle between the flanges may range downwardly from an angle of the order of 90° to considerably less than 90°, depending upon the desired spacing between the apex of the rib of the bead and the actual corner of the structure on which it is mounted.

Thus, the present invention, by utilizing the longitudinal edge wires on the bead to provide hinge-like connections between the flanges and the rib, provides a multipurpose reinforcing bead, which is an important feature.

Another object of the invention is to provide a longitudinal rib comprising a generally sinusoidal wire bent about its longitudinal axis into the desired generally U-shaped cross section for the rib. A related object is to provide a rib of wire, comprising at least one generally sinusoidal wire, which is bent into the desired U-shaped cross section and which includes opposed crests forming the longitudinal edges of the rib, the longitudinal edge wires being welded to the sinusoidal wire adjacent the respective longitudinal-edge-forming crests. With this construction, a rigid rib results, while still maintaining the desired flexible connections between the flanges and the rib.

Another object is to provide flanges each of which includes at least one generally sinusoidal wire, alternate crests of the generally sinusoidal wire of each flange being welded solely to the corresponding longitudinal edge wire on the rib. Another object in this connection is to provide flanges each including two generally sinusoidal wires disposed in overlapping relation and welded together at the points where they overlap, and each further including at least one longitudinal wire overlapping and welded to one of the sinusoidal wires thereof. With this construction, both of the flanges are also rigid, while still maintaining the desired hinge-like connections between the flanges and the rib.

An important object in connection with another embodiment of the invention is to provide a reinforcing bead, having many of the foregoing characteristics, which is bendable into an arcuate configuration for use as a corner bead of a curved archway, for example.

More particularly, an object in connection with such other embodiment of the invention is to provide a reinforcing bead having the construction hereinbefore outlined, with two exceptions. First, the longitudinal rib wires are omitted from one side of the rib, being present only on the apex and the other side of the rib. Second, the flange on said one side of the rib is welded directly to the generally sinusoidal wire of the rib, instead of to a longitudinal edge wire on the rib, and the sinusoidal wire or wires of such flange are not reinforced by any longitudinal wire or wires.

With the foregoing construction, the side of the reinforcing bead which is not provided with any longitudinal wires is capable of elongating longitudinally of the bead to permit bending of the bead into a curve, for application, for example, to a curved archway. It will be noted that there is still a hinge-like connection between the rib and the flange on the other side of the bead, because of the fact that such flange is welded to a longitudinal edge wire on the corresponding side of the rib.

The foregoing objects, advantages, features and results of the present invention, together with various other objects, advantages, features and results which will be evident to those skilled in the art to which the invention relates in the light of this disclosure, may be achieved with the exemplary embodiments of the invention described in detail hereinafter and illustrated in the accompanying drawings, in which:

FIG. 1 is a fragmentary elevational view illustrating one embodiment of the reinforcing bead of the invention as applied to a corner to act as a corner bead;

FIG. 2 is a sectional view taken as indicated by the arrowed line 2—2 of FIG. 1;

FIGS. 3 and 4 are greatly enlarged fragmentary sectional views taken as indicated by the arrowed lines 3—3 and 4—4 of FIG. 1;

FIG. 5 is a somewhat enlarged, fragmentary sectional view taken as indicated by the arrowed line 5—5 of FIG. 1;

FIG. 6 is a fragmentary sectional view similar to FIG. 2, but illustrating the embodiment of FIG. 1 in use on a flat surface to act as a screed bead;

FIG. 7 is a fragmentary elevational view showing one side of another embodiment of the reinforcing bead of the invention;

FIG. 8 is a fragmentary elevational view showing the other side of the reinforcing bead of FIG. 7;

FIG. 9 is a sectional view taken as indicated by the arrowed line 9—9 of FIG. 7; and FIG. 10 is a fragmentary elevational view generally similar to FIG. 8, but showing the reinforcing bead of FIGS. 7 to 9 bent into a curve.

*Reinforcing bead 20*

In FIGS. 1, 2 and 6 of the drawings are shown fragments of a wall 10 to be plastered or stuccoed. The wall may be of any suitable construction, the one shown being an interior wall comprising studs 12 having secured thereto plasterboards 14 to be covered with plaster 16. However, the wall 10 may also be an exterior wall prepared for stuccoing in a manner well known in the art, but not shown in the drawings.

A reinforcing bead of the invention is designated generally by the numeral 20 and is shown in FIGS. 1 and 2 of the drawings applied to a corner portion 22 of the wall 10 to act as a corner bead. In FIG. 6, the reinforcing bead 20 is shown applied to a flat portion 24 of the wall 10, over a joint 26 between two adjacent plasterboards 14, to act as a screed bead.

The reinforcing bead 20 of the invention is of open construction and made of wire. More particularly, it is made of a plurality of small-diameter wires which will be described hereinafter. The open construction of the reinforcing bead 20 permits the plaster 16, or other cementitious material, to be worked into the interior of the bead, as by means of a trowel, so as to render the plaster substantially continuous throughout the region occupied by the bead. The small-diameter wires of which the reinforcing bead 20 is made provide adequate reinforcement for the plaster 16, or other cementitious material, but occupy very little volume so that the plaster is substantially solid throughout the space occupied by the bead. The plaster remains substantially solid even if the wires rust out in time, there being only small holes in the cementitious material under such conditions. Consequently, the reinforcing bead 20 of the invention may be utilized exteriorly as a stucco bead since the structural integrity of the stucco is not affected significantly by deterioration of the bead itself.

Considering the reinforcing bead 20 of the invention in more detail now, it includes a central longitudinal rib 30 of open construction which is formed of a generally sinusoidal wire 32 bent along its central longitudinal axis into a generally U-shaped cross section, as best shown in FIGS. 2 and 6. The central longitudinal rib 30 has longitudinal edges 34 respectively formed by alternate ones of the crests 36 of the generally sinusoidal wire 32.

The reinforcing bead 20 includes longitudinal wires 40 welded directly to the generally sinusoidal wire 32 forming the central longitudinal rib 30. More particularly, the longitudinal wires 40 are welded to the generally sinusoidal wire 32 on the convex side or surface of the central longitudinal rib 30, the generally sinusoidal wire 32 and the longitudinal wires 40 being welded together at the points where they overlap.

It will be noted that the longitudinal wires 40 are arranged in a generally U-shaped array or pattern in cross section, as shown in FIGS. 2 and 6 of the drawings. Since the longitudinal wires 40 are located on the outer or convex side of the U-shaped rib 30, the longitudinal wires provide the rib with a substantially continuous external contour along which a trowel, not shown, can slide longitudinally of the reinforcing bead 20 without interference. Consequently, plaster, or other cementitious material, can readily be worked into the interior of the U-shaped rib 30 through the spaces between the longitudinal wires 40, thereby achieving the desired result of a substantially continuous or solid body of plaster throughout the space occupied by the reinforcing bead 20. In effect, the longitudinal wires 40 on the outer or convex side of the U-shaped central longitudinal rib 30 simulate a conventional sheet metal bead.

It will be noted that one of the longitudinal wires 40 is welded to the U-shaped longitudinal rib 30 at its apex, such wire being identified by the reference character 40a. The wires 40 nearest the longitudinal edges 34 of the rib 30 are referred to hereinafter as longitudinal edge wires and are identified by the reference character 40e. It will be noted that the longitudinal edge wires 40e are welded to the generally sinusoidal wire 32 of the rib 30 inwardly of the longitudinal edges 34 of the rib, i.e., inwardly of the apices of the alternate or opposed crests 36 of the generally sinusoidal wire. Intermediate the apex wire 40a and the edge wires 40e are intermediate longitudinal wires 40i. In the particular construction illustrated, there is one intermediate longitudinal wire 40i between the apex wire 40a and each edge wire 40e.

The reinforcing bead 20 preferably includes two longitudinal flanges 50 projecting laterally from the respective longitudinal edges 34 of the central longitudinal rib 30. Each longitudinal flange 50 is shown as including inner and outer, generally sinusoidal wires 52 and 54. The laterally outer crests 56 of the inner wire 52 and the laterally inner crests 58 of the outer wire 54 overlap and are welded together at the points where they overlap. Longitudinal wires 60 are welded to the laterally outer crests 62 of the outer wire 54. Preferably, the inner crests 58 of the outer wire 54 overlie the outer crests 56 of the inner wire 52, and the longitudinal wires 60 underlie the outer crests 62 of the outer wire 54. With this construction, the outer wire 54 is spaced outwardly from the wall 10, as shown in FIGS. 2 and 6, so that it can be completely enveloped by the plaster 16, or other cementitious material.

The essential feature of the present invention is that the longitudinal flanges 50 are secured to the central longitudinal rib 30 by welding the inner crests 64 of the inner generally sinusoidal wire 52 solely to the respective longitudinal edge wires 40e, and not to the generally sinusoidal wire 32 of the rib. It will be noted from FIG. 1 that the inner crests 64 of the inner generally sinusoidal wire 52 are disposed between the crests 36 of the generally sinusoidal rib wire 32 on the corresponding side of the longitudinal rib 30.

With the foregoing construction, the longitudinal edge wires 40e on the central longitudinal rib 30 are capable of twisting, between the points where they are welded to the crests 36 of the generally sinusoidal rib wire 32 and the inner crests 64 of the inner generally sinusoidal flange wires 52, to permit varying the included angle between the longitudinal flanges 50. In effect, the longitudinal edge wires 40e act as hinges permitting pivotal movement of the longitudinal flanges 50 relative to the central longitudinal rib 30, which pivotal movement can be produced manually by the application of moderate forces.

By adjusting the included angle between the longitudinal flanges 50 in the foregoing manner, the distance of the apex wire 40a from the apex of the corner portion 22 of the wall 10 can be varied to provide an adjustable gauge for the thickness of the plaster 16 to be applied. Also, when the reinforcing bead 20 is used as a screed bead, the included angle between the longitudinal flanges 50 can be varied in a similar manner, by twisting the longitudinal edge wires 40e, to vary the distance that the apex wire 40a is spaced from the flat wall portion 24. Again, the reinforcing bead may thus be adjusted to regulate the depth of the plaster coating to be applied.

Normally, the reinforcing bead 20 of the invention will be furnished as a corner bead, wherein the included angle between the longitudinal flanges 50 is of the approximate order of 90°, and as a screed bead, wherein the included angle is of the approximate order of 180°. However, the corner bead version can be converted to the screed bead version, and vice versa, very readily because of the hinge-like action provided by the longitudinal edge wires 40e.

Although the included angle between the longitudinal flanges 50 can be varied readily in the foregoing manner by twisting of the longitudinal edge wires 40e, the longitudinal flanges 50 themselves, and the central longitudinal rib 30, are quite rigid, due to their construction of generally sinusoidal wires reinforced by longitudinal wires. Thus as, the reinforcing bead 20 is adjusted to vary the included angle between the longitudinal flanges 50, distortion of the reinforcing bead is substantially restricted to twisting of the longitudinal edge wires 40e. Also, when the reinforcing bead 20 is installed, as by nailing, it is quite rigid so that it cannot be distorted readily as the plaster 16 is applied.

Considering the manner in which the reinforcing bead 20 of the invention may be made, the various generally sinusoidal wires 32, 52 and 54 and the various longitudinal wires 40a, 40e, 40i and 60 may be fed, in their proper relative lateral positions (and in their proper relative longitudinal positions in the case of the generally sinusoidal wires), between two welding rolls, not shown, with the reinforcing bead in flat condition. Subsequently, the generally sinusoidal wire 32 is bent about its central longitudinal axis to form the central longitudinal rib 30, the direction of bending being such that the longitudinal wires 40a, 40e and 40i are on the external or convex side of the rib. This may be accomplished by suitable bending rolls, not shown. If the reinforcing bead 20 is to be used as a screed bead, the longitudinal flanges 50 are left flat, so that the included angle therebetween is of the order of 180°. However, if the reinforcing bead 20 is to be used as a corner bead, bending rolls, not shown, may be utilized to reduce the included angle between the longitudinal flanges 50 to of the order of 90°, by twisting of the longitudinal edge wires 40e in the manner hereinbefore described.

As disclosed in more detail in my aforementioned patent, the apex wire 40a may be provided with a plastic longitudinal nose piece 70. This nose piece is crescent shaped and is provided, circumferentially thereof, with a central portion 72 which is relatively thick, such central portion tapering circumferentially in both directions to thin, feathered edges 74 which are relatively sharp, i.e., which are virtually knife edges. The edges 74 are relatively closely spaced in the unstressed condition of the plastic nose piece 70, the lateral spacing therebetween being considerably less than the diameter of the apex wire 40a.

The plastic material of which the nose piece 70 is formed is sufficiently flexible to permit separation of the longitudinal edges 74 to an extent equal to the diameter of the apex wire 40a, whereupon the nose piece may be snapped over the apex wire, as best shown in FIGS. 3 to 5 of the drawings. The plastic material of the nose piece 70 also has sufficient resilience or elasticity to cause the nose piece to close around and behind the apex wire 40a, as best shown in FIGS. 3 and 4. As the longitudinal edges 74 of the plastic nose piece 70 close around the apex wire 40a, they are indented or notched, as indicated at 76, at the points where the apex wire 40a is welded to the generally sinusoidal wire 32. Such indenting or notching of the tapered edges 74 may be augmented by pressing inwardly on the sides of the plastic nose piece 70 during assembly, as by means of a clamping or rolling operation, for example. In any event, the net result is that the plastic nose piece 70 is firmly locked in place against accidental dislodgment during handling, shipping, nailing, plastering or stuccoing, and the like.

The functions performed by the plastic nose piece 70 are fully set forth in my aforementioned patent. Consequently, a further description herein is not necessary.

Reinforcing bead 120

Turning to FIGS. 7 to 10 of the drawings, illustrated therein is a reinforcing bead 120 of the invention which is shown in FIG. 9 as applied to a corner portion 122 of a wall 110, which corner portion may either be straight, or curved, as in an archway, for example. The reinforcing bead 120 is identical in most respects to the reinforcing bead 20. Consequently, common structural features will be described briefly, and only the differences will be described in detail.

The reinforcing bead 120 includes a central longitudinal rib 130 of open construction which is formed of a generally sinusoidal wire 131 bent along its central longitudinal axis into a generally U-shaped cross section, as shown in FIG. 9, to provide the rib with two flanges or sides 132 and 133. The sides 132 and 133 of the rib 130 respectively terminate in longitudinal edges 134 and 135 respectively formed by alternate crests 136 and 137 of the generally sinusoidal wire 131.

The reinforcing bead 120 also includes a longitudinal apex wire 140a welded directly to the generally sinusoidal wire 131 at the apex of, and on the convex side of, the rib 130. Also welded directly to the generally sinusoidal wire 131, on the convex side of the rib 130, are longitudinal edge and intermediate wires 140e and 140i, these wires being located on the flange or side 132 of the rib 130. It will be noted that there are no longitudinal edge and intermediate wires on the flange or side 133 of the rib 130.

The longitudinal apex, edge and intermediate wires 140a, 140e and 140i provide the side 132 of the rib 130 with a substantially continuous external contour along which a trowel, not shown, can slide longitudinally of the reinforcing bead 120 without interference. Consequently, plaster, or other cementitious material, can readily be worked into the interior of the U-shaped rib 130 through the spaces between the longitudinal wires mentioned, thereby achieving the desired result of a substantially continuous or solid body of plaster throughout the space occupied by the reinforcing bead 120. In effect, the longitudinal wires 140a, 140e and 140i on the convex side of the flange 132 of the central longitudinal rib 130 simulate one side of a conventional sheet metal bead. The apex wire 140a may have secured thereto a nose piece 141 corresponding to the nose piece 70.

The reinforcing bead 120 includes a longitudinal flange 142 projecting laterally from the longitudinal edge 134 of the central rib 130. More particularly, the longitudinal flange 142 includes an inner generally sinusoidal wire 143 having inner crests 144 underlying and welded to the longitudinal edge wire 140e to provide the hinge-like action hereinbefore discussed. The longitudinal flange 142 is also shown as including an outer generally sinusoidal wire 145 having inner crests 146 underlying and welded to outer crests 147 of the inner generally sinusoidal wire 143. Overlying and welded to outer crests 148 of the generally sinusoidal wire 145 is a longitudinal reinforcing wire 149. Thus, the longitudinal flange 142 of the reinforcing bead 120 is identical to the longitudinal flanges 50 of the reinforcing bead 20.

On the side 133 of the central longitudinal rib 130 is a longitudinal flange 150 which projects laterally from the corresponding longitudinal edge 135 of the rib. The longitudinal flange 150 is shown as including an inner generally sinusoidal wire 151 having inner crests 152 overlying and welded to the crests 137 of the general sinusoidal rib wire 131, instead of to a longitudinal edge wire. The flange 150 also includes an outer generally sinusoidal wire 153 having inner crests 154 underlying and welded to outer crests 155 of the inner generally sinusoidal wire 151. The longitudinal flange 150 does not include any longitudinal wire corresponding to the longitudinal wire 149 of the longitudinal flange 142.

With the foregoing construction, the side 133 of the central longitudinal rib 130 and the longitudinal flange 150 are not longitudinally reinforced by any longitudinal wires. Consequently, the side 133 of the central longitudinal rib 130 and the longitudinal flange 150 are readily expandable or stretchable in the longitudinal direction to permit bending the reinforcing bead 120 into a curve, as shown in FIG. 10. The resulting curved reinforcing bead 120 may then be applied to a curved edge of an archway, for example, or to any other curved corner.

Because of the hinge-like connection between the longitudinal flange 142 and the side 132 of the central longitudinal rib 130, the included angle between the flanges 142 and 150 can readily be varied, prior to bending the entire reinforcing bead 120 into the curved shape shown in FIG. 10, to vary the outward offset of the apex wire 140a from the corner portion 122 of the wall 110. Furthermore, the longitudinal apex, edge and intermediate wires 140a, 140e and 140i provide the side 132 of the central longitudinal rib 130 with a substantially continuous external contour along which a trowel, not shown, can slide longitudinally of the reinforcing bead 120 without interference. Consequently, plaster or other cementitious material, can readily be troweled into the interior of the U-shaped rib 130 through the spaces between the longitudinal rib wires mentioned, thereby achieving the desired result of a substantially continuous or solid body of plaster throughout the space occupied by the reinforcing bead 120.

The reinforcing bead 120 may be made in substantially the same manner as hereinbefore discussed in connection with the reinforcing bead 20.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:
1. In a reinforcing bead for materials such as plaster and stucco, the combination of:
   (a) a longitudinal rib of open construction and of generally U-shaped cross section;
   (b) longitudinal wires secured directly to one side of said rib;
   (c) said longitudinal wires providing said one side of said rib with a substantially continuous contour while permitting the introduction of such materials as plaster and stucco into the interior of said rib between said longitudinal wires;
   (d) a longitudinal flange of open construction projecting laterally from said one side of said rib; and
   (e) said flange being secured solely to the longitudinal wire on said one side of said rib which is nearest the corresponding edge thereof.

2. In a reinforcing bead for materials such as plaster and stucco, the combination of:
   (a) a longitudinal rib of open construction and of generally U-shaped cross section;
   (b) longitudinal wires welded directly to one side of said rib on the convex surface thereof;
   (c) said longitudinal wires providing said one side of said rib with a substantially continuous external contour while permitting the introduction of such materials as plaster and stucco into the interior of said rib between said longitudinal wires;
   (d) a longitudinal flange of open construction projecting laterally from said one side of said rib; and
   (e) said flange being welded solely to the longitudinal wire on said one side of said rib which is nearest the corresponding edge thereof.

3. In a reinforcing bead for materials such as plaster and stucco, the combination of:
   (a) a longitudinal rib of open construction and of generally U-shaped cross section and formed of wire;
   (b) longitudinal wires welded directly to the wire forming said rib on one side of said rib and on the convex surface of said rib;
   (c) said longitudinal wires providing said one side of said rib with a substantially continuous external contour while permitting the introduction of such materials as plaster and stucco into the interior of said rib between said longitudinal wires;
   (d) a longitudinal flange of open construction projecting laterally from said one side of said rib and formed of wire; and
   (e) the wire of said flange being welded solely to the longitudinal wire on said one side of said rib which is nearest the corresponding edge thereof.

4. In a reinforcing bead for materials such as plaster and stucco, the combination of:
   (a) a longitudinal rib of open construction and of generally U-shaped cross section and formed of wire;
   (b) longitudinal wires welded directly to the wire forming said rib on the convex surface of said rib and arranged in a generally U-shaped pattern in cross section;
   (c) said longitudinal wires providing said rib with a substantially continuous, generally U-shaped external contour while permitting the introduction of such materials as plaster and stucco into the interior of said rib between said longitudinal wires;
   (d) longitudinal flanges of open construction projecting laterally from the respective longitudinal edges of said rib and formed of wire; and
   (e) the wire forming each of said flanges being welded solely to the longitudinal wire on said rib which is nearest the corresponding longitudinal edge of said rib.

5. In a reinforcing bead for materials such as plaster and stucco, the combination of:
   (a) a longitudinal rib of open construction and of generally U-shaped cross section and formed of wire;
   (b) longitudinal wires welded directly to the wire forming said rib on the convex surface of said rib and arranged in a generally U-shaped pattern in cross section;
   (c) said longitudinal wires providing said rib with a substantially continuous, generally U-shaped external contour while permitting the introduction of such materials as plaster and stucco into the interior of said rib between said longitudinal wires;

(d) longitudinal flanges of open construction projecting laterally from the respective longitudinal edges of said rib and each including a generally sinusoidal wire; and (e) alternate crests of said generally sinusoidal wire of each of said flanges being welded solely to the longitudinal wire on said rib which is nearest the corresponding longitudinal edge of said rib.

6. In a reinforcing bead for materials such as plaster and stucco, the combination of:

(a) a longitudinal rib of open construction and of generally U-shaped cross section and including at least one generally sinusoidal wire having opposed crests which form longitudinal edges of said rib;

(b) longitudinal wires welded directly to the generally sinusoidal wire forming said rib on the convex surface of said rib and arranged in a generally U-shaped pattern in cross section;

(c) said longitudinal wires providing said rib with a substantially continuous, generally U-shaped external contour while permitting the introduction of such materials as plaster and stucco into the interior of said rib between said longitudinal wires;

(d) longitudinal flanges of open construction projecting laterally from the respective longitudinal edges of said rib and each including a generally sinusoidal wire; and (e) alternate crests of said generally sinusoidal wire of each of said flanges being welded solely to the longitudinal wire on said rib which is nearest the corresponding longitudinal edge of said rib.

7. In a reinforcing bead for materials such as plaster and stucco, the combination of:

(a) a longitudinal rib of open construction and of generally U-shaped cross section and including at least one generally sinusoidal wire having opposed crests which form longitudinal edges of said rib;

(b) longitudinal wires welded directly to the generally sinusoidal wire forming said rib on the convex surface of said rib and arranged in a generally U-shaped pattern in cross section;

(c) said longitudinal wires providing said rib with a substantially continuous, generally U-shaped external contour while permitting the introduction of such materials as plaster and stucco into the interior of said rib between said longitudinal wires;

(d) longitudinal flanges of open construction projecting laterally from the respective longitudinal edges of said rib and each including a generally sinusoidal wire;

(e) alternate crests of said generally sinusoidal wire of each of said flanges being welded solely to the longitudinal wire on said rib which is nearest the corresponding longitudinal edge of said rib; and (f) each of said flanges including a second generally sinusoidal wire overlapping and welded to the first-mentioned generally sinusoidal wire thereof.

8. In a reinforcing bead for materials such as plaster and stucco, the combination of:

(a) a longitudinal rib of open construction and of generally U-shaped cross section and formed of wire;

(b) longitudinal wires welded directly to the wire forming said rib on one side of said rib and on the convex surface of said rib;

(c) said longitudinal wires providing said one side of said rib with a substantially continuous external contour while permitting the introduction of such materials as plaster and stucco into the interior of said rib between said longitudinal wires;

(d) a first longitudinal flange of open construction projecting laterally from said one side of said rib and formed of wire;

(e) the wire of said first flange being welded solely to the longitudinal wire on said one side of said rib which is nearest the corresponding edge thereof; and (f) a second longitudinal flange of open construction projecting laterally from the other side of said rib and formed of wire welded directly to the wire of said rib adjacent the corresponding edge of said rib.

References Cited

UNITED STATES PATENTS

| | | | |
|---|---|---|---|
| 1,346,437 | 7/1920 | Albinson | 52—255 X |
| 2,029,817 | 2/1936 | Fegles | 52—255 X |
| 2,645,930 | 7/1953 | Stockton | 52—255 X |
| 3,175,330 | 3/1965 | Holsman | 52—254 |

HENRY C. SUTHERLAND, *Primary Examiner.*